United States Patent
Son et al.

(10) Patent No.: US 7,934,598 B2
(45) Date of Patent: May 3, 2011

(54) PROTECTIVE FILM-INTEGRATED POUCH FOR DISPLAY PANEL

(75) Inventors: Ki Mock Son, Daegu-si (KR); Young Hee An, Paju-si (KR); Jong Hag Kim, Seoul (KR); Young Hee Kim, Gwacheon-si (KR); Han Jun Kang, Suwon-si (KR); Hee Sik Han, Gunpo-si (KR); Sang Min Lee, Ansan-si (KR); Jong Seon Kim, Seoul (KR)

(73) Assignees: LG Display Co., Ltd., Seoul (KR); Youlchon Chemical Ltd., Seoul (KR)

( * ) Notice: Subject to any disclaimer, the term of this patent is extended or adjusted under 35 U.S.C. 154(b) by 0 days.

(21) Appl. No.: 12/461,077

(22) Filed: Jul. 30, 2009

(65) Prior Publication Data

US 2010/0155278 A1    Jun. 24, 2010

(30) Foreign Application Priority Data

Dec. 22, 2008  (KR) ................. 10-2008-0131323

(51) Int. Cl.
*B65D 85/38* (2006.01)
(52) U.S. Cl. ............ 206/454; 206/524.2; 206/720
(58) Field of Classification Search ............ 206/449, 206/454, 455, 484–484.2, 524.2, 720; 428/35.2, 428/35.3
See application file for complete search history.

(56) References Cited

U.S. PATENT DOCUMENTS

| | | | | |
|---|---|---|---|---|
| 4,150,744 A | * | 4/1979 | Fennimore | 206/484.1 |
| 4,663,218 A | * | 5/1987 | Akao | 428/35.3 |
| 4,701,359 A | * | 10/1987 | Akao | 428/35.2 |
| 4,756,414 A | * | 7/1988 | Mott | 206/720 |
| 4,894,264 A | * | 1/1990 | Akao et al. | 206/524.2 |
| 4,906,494 A | * | 3/1990 | Babinec et al. | 428/35.2 |
| 5,784,860 A | * | 7/1998 | Fujikawa et al. | 206/720 |
| 5,791,485 A | * | 8/1998 | Carbonneau | 206/720 |
| 5,885,673 A | * | 3/1999 | Light et al. | 206/484 |
| 6,158,590 A | * | 12/2000 | Fujikawa et al. | 206/720 |
| 2009/0130342 A1 | * | 5/2009 | Endo | 206/454 |

* cited by examiner

*Primary Examiner* — Bryon P Gehman
(74) *Attorney, Agent, or Firm* — McKenna Long & Aldridge LLP

(57) ABSTRACT

Disclosed is a protective film-integrated pouch wherein a protective film to protect a display panel and a bag to cover and package the display panel are integrally formed. The protective film-integrated pouch includes a rectangular body, including upper and lower layers, the body having three sealed edges and one opened edge to define an opening, allowing insertion of a display panel into the pouch, wherein each of the upper layer and the lower layer includes a base layer made of a metallic material, an outer surface layer disposed on the base layer, and an inner surface layer disposed on the outer surface layer, wherein the inner surface layer contacts the display panel and is made of a mixed polyethylene resin.

8 Claims, 4 Drawing Sheets

PROTECTIVE FILM-INTEGRATED POUCH FOR DISPLAY PANEL

This application claims the benefit of Korean Patent Application No. 2008-131323, filed on Dec. 22, 2009, which is hereby incorporated by reference as if fully set forth herein.

BACKGROUND OF THE INVENTION

1. Field of the Invention

The present invention relates to a protective film-integrated pouch. More specifically, the present invention relates to a protective film-integrated pouch wherein a protective film to protect a display panel and a bag to cover and package the display panel are integrally formed.

2. Discussion of the Related Art

Various display devices such as liquid crystal displays (LCDs), cathode-ray tubes (CRTs, also called "Braun tubes") and plasma display panels (PDPs) are covered with a protective film attached to a display member and are stored in a pouch provided with one or more additional protective films. The protective films and the pouch should not be contaminated by dust or foreign materials during manufacturing, storage and transfer processes. Furthermore, the protective film should prevent scratches due to foreign materials on the display screen.

Hereinafter, a process for attaching a conventional protective film to the surface of a display device will be described.

FIG. 1 is a plan view illustrating a conventional display panel and a protective film covering the display panel.

As shown in FIG. 1, a conventional display panel 10 is disposed on the protective film 15, and the display panel 10 and the protective film 15 are attached to each other at the edge of the display panel 10 using a masking tape 12. Although not shown, an additional pocket-shaped pouch is provided, which houses the display panel, to which the protective film 15 is attached, during transferring of the display panel 10.

The protective film 15 is fixed on the display panel 10 through an adhesion process using the masking tape 12. Accordingly, the adhesion process requires accurate attention of an operator. For this reason, operator inattention may disadvantageously cause deterioration in production efficiency.

In addition, since the protective film 15 directly contacts the display panel 10, after adhesion, a component constituting the protective film 15 is diffused into the display panel 10 and then contaminates the display panel 10, thus disadvantageously causing variation in physical properties of the surface of the display panel 10. In particular, when a polarizing plate (not shown) is formed on the uppermost surface of the display panel 10, the phenomenon, so-called, pol-dirty, wherein the surface of the display panel 10 is scratched due to additives contained in the protective film 15 may occur.

In addition, the protective film 15 to protect the surface of the display panel and the pouch to carry the display panel are separated from each other, thus disadvantageously causing deterioration in operation efficiency.

SUMMARY OF THE INVENTION

Accordingly, the present invention is directed to a protective film-integrated pouch that substantially obviates one or more problems due to limitations and disadvantages of the related art.

It is an object of the present invention to provide a protective film-integrated pouch wherein a protective film to protect a display panel and a bag to cover and package the display panel are integrally formed, which is free of contamination by external impact or foreign materials, thus preventing scratches, and is capable of efficiently protecting the surface of the display panel.

To achieve these objects and other advantages and in accordance with the purpose of the invention, as embodied and broadly described herein, provided is a protective film-integrated pouch including a rectangular body, including upper and lower layers, the body having three sealed edges and one opened edge to define an opening, allowing insertion of a display panel into the pouch, wherein each of the upper layer and the lower layer includes: a base layer made of a metallic material; an outer surface layer disposed on the base layer; and an inner surface layer disposed on the outer surface layer, wherein the inner surface layer contacts the display panel and is made of a mixed polyethylene resin.

The base layer may be made of an aluminum foil.

The outer surface layer may be made of a nylon film.

The base layer may have a thickness of 5 to 10 μm, the outer surface layer may have a thickness of 8 to 20 μm, and the inner surface layer may have a thickness of 20 to 100 μm.

The inner surface layer may comprise: an intermediate layer; and a first surface layer and a second surface layer disposed on both sides of the intermediate layer, wherein at least one of the first surface layer and the second surface layer is made of a resin having a hardness lower than a hardness of surface of the display panel, and the intermediate layer is made of a high-density polyethylene-containing resin.

The resin constituting the first and second surface layers may have a pencil hardness lower than 2.5 H.

The intermediate layer may be made of a mixed resin of high-density polyethylene, and linear low-density polyethylene or medium-density polyethylene.

The intermediate layer may consist of 20 to 80% by weight of the linear low-density polyethylene or medium-density polyethylene and 20 to 80% by weight of the high-density polyethylene.

The protective film-integrated pouch may further comprise an antistatic layer coated on the surface of the first or second surface layer that is not directly in contact with the display panel.

The inner surface layer of the upper layer may be thicker than the inner surface layer of the lower layer.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and along with the description serve to explain the principle of the invention. In the drawings.

DETAILED DESCRIPTION OF THE INVENTION

Hereinafter, preferred embodiments of a protective film-integrated pouch according to the present invention will be described in detail with reference to the accompanying drawings.

Figure 1:
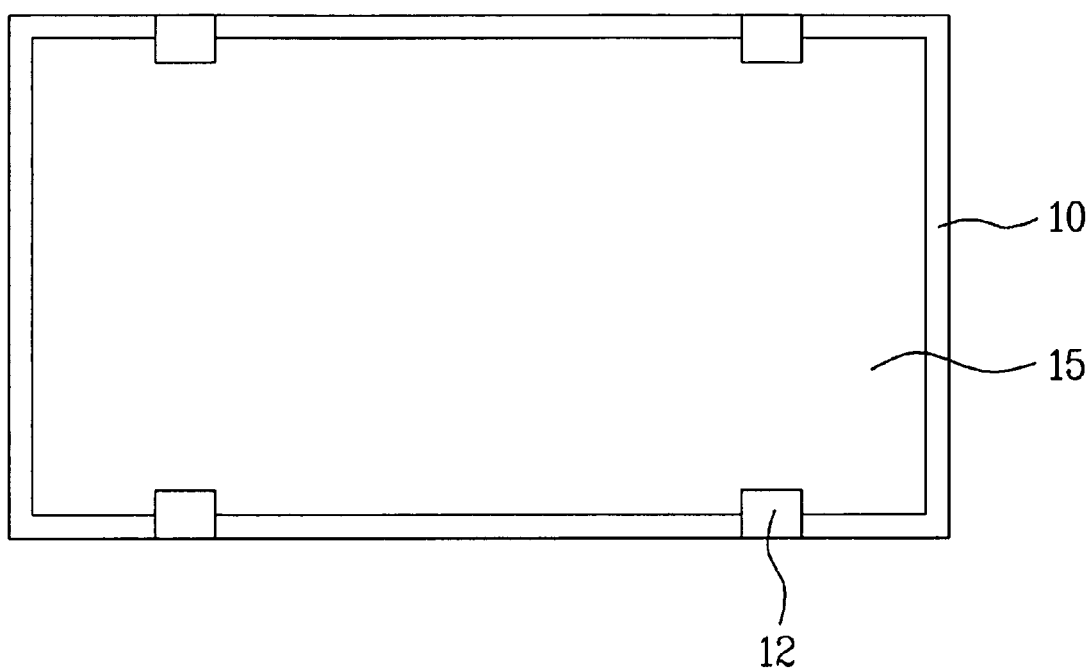
FIG. 1 is a plan view illustrating a conventional display panel and a protective film covering the display panel.
Figure 2:
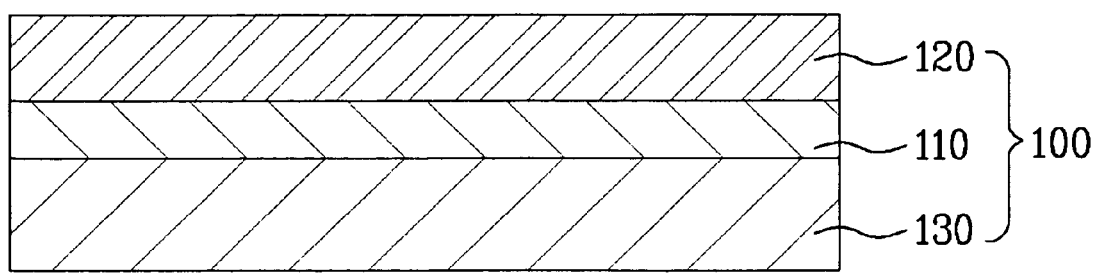
FIG. 2 is a sectional view illustrating a protective film-integrated pouch.

FIG. 2 is a sectional view illustrating a protective film-integrated pouch.

As shown in FIG. 2, the protective film-integrated pouch 100 comprises a metallic base layer 110, an outer surface layer 120 serving as an outer cover of the base layer 110 and an inner surface layer 130 that is in direct contact with a display panel (not shown).

The metallic base layer 110 has a sufficient hardness to prevent breakage occurring upon transport of display panels or insertion of display panels into a pouch, and may utilize a metallic thin film or an aluminum film (Al-foil). The metallic base layer 110 has a thickness of about 200 to 500☐ for the metallic base layer, and about 5 to 10 μm for the aluminum film.

The outer surface layer 120 utilizes a nylon film which is resistant to external impacts and stress. In this case, the outer surface layer 120 has a thickness of about 8 to 20 μm.

The outer surface layer 120 is harder than the inner surface layer 130 which directly contacts the display panel and is thus hard, in order to prevent a protective film-integrated pouch from being snagged on the sharp edge or cover shield of the panel. For a material constituting the outer surface layer 120, nylon films such as polyethylene terephthalate resins are preferable to soft materials.

The inner surface layer 130 may comprise a low-density polyethylene layer as a base layer, and single or multiple layers as other components and layers. In this case, an anti-reflective coating (not shown) may be further coated on the surface of the inner surface layer 130 which directly contacts the display panel (not shown). The inner surface layer 130 has a thickness of about 20 to 100 μm, in order to allow the pouch to sufficiently resist external impact or stress upon insertion and secure stiffness.

The inner surface layer 130 is a layer that contacts the display panel and is made of a soft resin whose hardness is lower than a hardness (e.g., pencil hardness of 2 to 3 H) of the surface of the display panel and whose main component is polyethylene to prevent occurrence of scratches.

Figure 3:
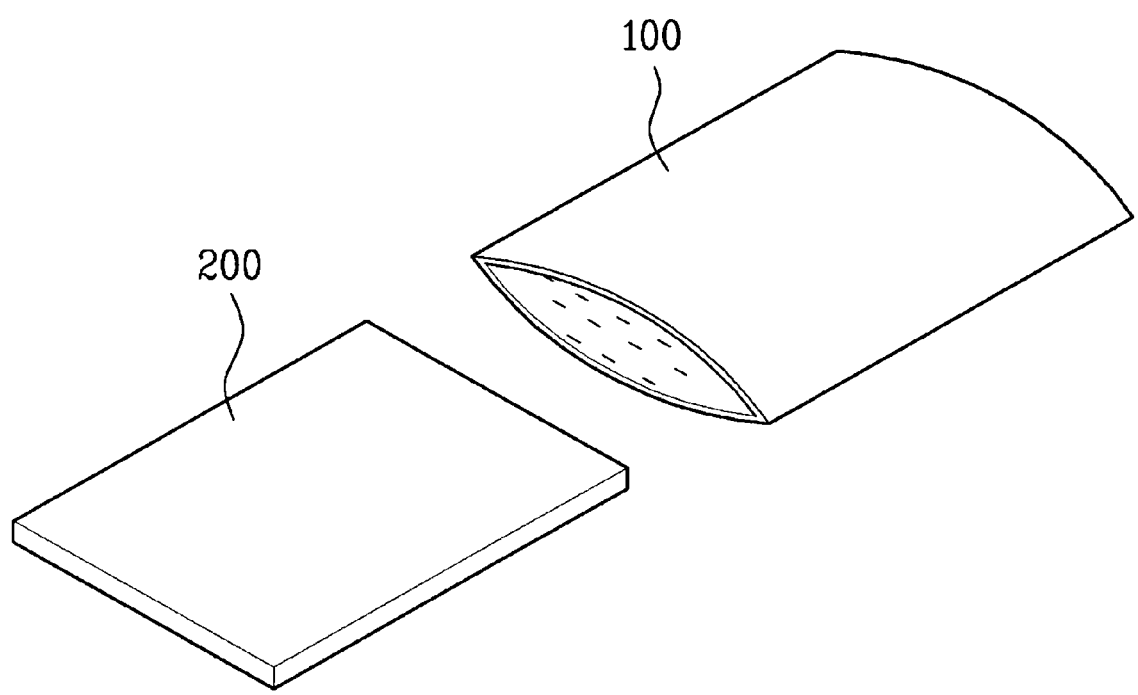
FIG. 3 is a perspective view illustrating a process for inserting a display panel into a protective film-integrated pouch according to the present invention.
Figure 4:
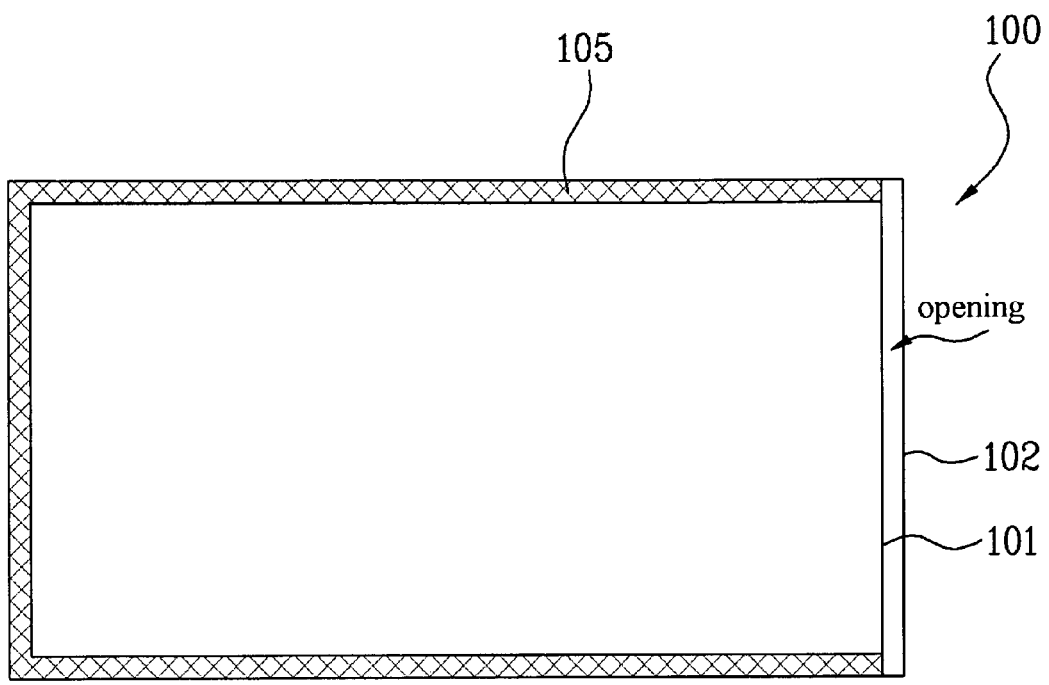
FIG. 4 is a plan view illustrating the protective film-integrated pouch according to the present invention, viewed from the top.

FIG. 3 is a perspective view illustrating a process for inserting a display panel into a protective film-integrated pouch according to the present invention, and FIG. 4 is a plan view illustrating the protective film-integrated pouch according to the present invention, viewed from the top.

As shown in FIGS. 3 and 4, the protective film-integrated pouch 100 comprises a rectangular body, including two layers, i.e., a upper film laminate 101 and a lower film laminate 102, wherein the body has three sealed edges and one opened edge to define an opening, allowing insertion of a display panel into the pouch, and each of the upper film laminate and the lower film laminate comprises the base layer 110, the outer surface layer 120 and the inner surface layer 130. As shown in FIG. 4, the sealing is carried out such that the upper film laminate 101 is smaller than the lower film laminate 102, to provide a different shape of opening and thereby to allow the display panel 200 to easily be introduced into the space between the upper and lower film laminates 101 and 102.

The outer surface layer 120 is laminated on the base layer 110, the inner surface layer 130 is further laminated on the resulting structure including the base layer 110 and the outer surface layer 120 to form a film laminate, another film laminate is stacked on the film laminate, and the ends of the resulting three sides are sealed, to manufacture a pouch having the remaining side provided with an opening, as shown in FIG. 4. A urethane or acrylic resin may be used as an adhesive in the lamination of the sealing portion 105. At this time, the lamination process may further comprise aging the laminates for a sufficient time of 30 hours to prevent blistering between the layers.

When a polarizing plate-containing display panel is housed in the pouch thus manufactured, foreign materials or contaminants are not generated on the panel and scratching thereof is prevented. In addition, the pouch comprises the base layer 110, thus being capable of efficiently shielding humidity and oxygen, and preventing permeation of rays of light during storage.

Hereinafter, the inner surface layer will be described with reference to the drawings in more detail.

Figure 5:
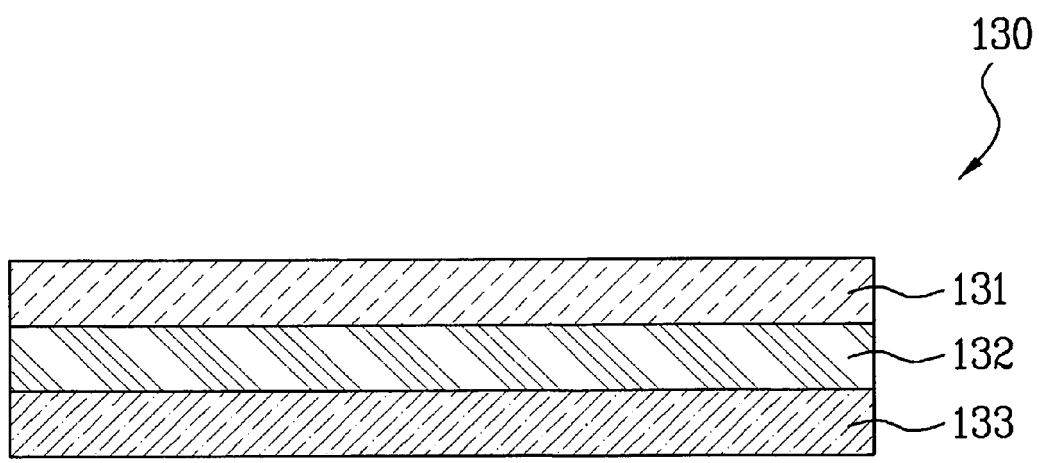
FIG. 5 is a sectional view illustrating an example of an inner surface layer shown in FIG. 2.
Figure 6:
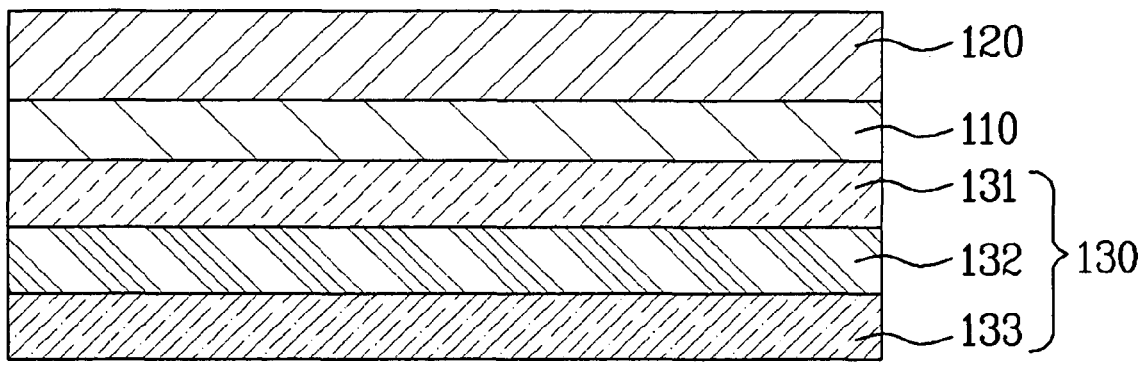
FIG. 6 is a sectional view illustrating a protective film-integrated pouch comprising the inner surface layer shown in FIG. 5.

FIG. 5 is a sectional view illustrating an example of an inner surface layer shown in FIG. 2, and FIG. 6 is a sectional view illustrating a protective film-integrated pouch comprising the inner surface layer shown in FIG. 5.

As shown in FIG. 5, the inner surface layer 130 according to one embodiment comprises a first surface layer 131, an intermediate layer 132 and a second surface layer 133 which are laminated in this order.

The first surface layer 131 or the second surface layer 133 comes in contact with the display panel, which is made of a soft resin whose hardness is lower than the surface hardness (e.g., pencil hardness: 2 to 3 H) of the display panel 200.

In the present invention, a resin constituting the surface layer which contacts the surface protected by a surface-protecting film is selected from a soft resin whose hardness is lower than the surface hardness of the protected surface, thus absorbing impact and thereby preventing scratching.

For example, the soft resin has the desired hardness, which is selected from the group consisting of polyethylene resins, polypropylene resins, polyethylene terephthalate resins, polyvinylalcohol resins, nylon resins, polyacrylonitrile resins, poly (methacrylic acid) resins and combinations thereof.

Taking into consideration prevention of surface damage and contamination, i.e., surface protection, a polyethylene resin may be used as the soft resin.

The polyethylene resin may be selected from the group consisting of low-density polyethylene, medium-density polyethylene, high-density polyethylene, low-density linear polyethylene, ethylene-vinyl acetate copolymers, ethylene-methacrylic acid copolymers and carbonate derivatives thereof.

Meanwhile, the intermediate layer 132 is a high-density polyethylene-containing resin layer. The use of the high-density polyethylene imparts sufficient stiffness to the inner surface layer 130, in order to enable easy operation.

The intermediate layer 132 consists of 20 to 80% by weight of linear low-density polyethylene or medium-density polyethylene, and 20 to 80% by weight of high-density polyethylene.

When the high-density polyethylene is present in an amount of 20% by weight or more, stiffness is good. When the high-density polyethylene is present in an amount exceeding 80% by weight, a great amount of organometals, or chromium, vanadium or molybdenum oxide catalysts added in the preparation of the high-density polyethylene are diffused on the surface layer and thus cause a deterioration in physical properties of the films and an increase in film price. Accordingly, it is preferred that the content of the high-density polyethylene does not exceed 80% by weight.

Taking into consideration stiffness, high-density polyethylene is added in an amount of 20% by weight, preferably, 50% by weight. However, when considering deterioration in physical properties of films and increase in film price, the high-density polyethylene is added in an amount not higher than 80% by weight.

The intermediate layer 132 may further contain an antioxidant to improve thermal stability, process stability and wearability. For example, the intermediate layer 132 is made of a polyethylene resin, and the antioxidant may be added in an amount of about 200 to about 1,500 ppm. The content of the antioxidant may be varied depending on the type of resin used. The antioxidant may be a phenol- or phosphorus-based antioxidant.

As shown in FIG. 5, the inner surface layer 130 is manufactured in the form of a tri-layer laminate film by co-extruding the layers. The inner surface layer 130 exhibits superior stiffness, workability, thermal stability, and anti-acid, anti-solvent and antistatic properties, and minimizes surface damage or scratches caused by contaminants such as external dust or mote which may occur upon transfer, storage and processing of displays such as polarizing plates.

The inner surface layer 130 has a thickness of 20 to 100 μm, and is thickener than the base layer 110 or the outer surface layer 120 shown in FIG. 6. Since the inner surface layer 130 has a thickness lower than 20 μm, it is not easy to handle upon operation (insertion of display panel into a protective film-integrated pouch). Meanwhile, the film is thicker than 100 μm, thus involving an unnecessary increase in price. Accordingly, the thickness of the inner surface layer 130 should be within the range as defined.

Meanwhile, an antistatic layer (not shown) may be further formed on the side of the first surface layer 131 or the second surface layer 133 which directly contacts the display panel 200. However, since when the antistatic layer directly contacts the polarizing plate disposed on the display panel 200, pol-dirty may occur due to low-molecular weight of the antistatic layer, the antistatic layer may be omitted or formed as a thin coating layer. In this case, an antistatic layer may be formed on the side of the layer (represented by a reference numeral "131") which does not directly contact the display panel 200.

Hereinafter, reliability required for the pouch obtained from tests for, wearability and availability of the protective film-integrated pouch of the present invention will be described in detail.

Test results for constant-voltage property, vibration tests, water permeability, high-temperature stability, and the presence of the pol-dirty by rubbing at ambient/high temperature will be described.

To confirm whether or not static electricity is generated on the side of the pouch in contact with the display panel 200 due to omission of the antistatic layer, the present inventors rubbed the sample (the protective film-integrated pouch) with a paper for printing ten times at respective points with a load of 4 to 5 Kg and then measured frictional electrostatic voltage with a constant-voltage meter at the points.

In this case, as can be seen from Table 1 (unit: V), as compared to a pouch separated from a protective film, the protective film-integrated pouch containing no antistatic layer according to the present invention exhibits a slight increase in constant voltage, and all samples have a constant-voltage of 4 KV or less, the test standard of liquid crystal panels. Accordingly, as can be seen from the constant-voltage test results, the protective film-integrated pouch comprising the inner surface layer 130, from which an antistatic layer is extruded, is free from defect factors associated with static electricity which may occur by insertion of the display panel into the protective film-integrated pouch.

TABLE 1

| Type | | 1 | 2 | 3 | 4 | 5 | 6 | 7 | 8 | 9 | 10 | Average (V) |
|---|---|---|---|---|---|---|---|---|---|---|---|---|
| Conventional pouch | Outer surface | 90 | 20 | 20 | 10 | 10 | 10 | 10 | 50 | 10 | 10 | 24 |
| | Inner surface | 60 | 70 | 40 | 30 | 40 | 40 | 50 | 30 | 40 | 50 | 45 |
| Pouch of the present invention | Outer surface | 150 | 140 | 120 | 130 | 140 | 130 | 170 | 160 | 140 | 120 | 140 |
| | Inner surface | 200 | 140 | 160 | 170 | 150 | 150 | 180 | 170 | 240 | 220 | 178 |

As apparent from the fore-going, in the protective film-integrated pouch of the present invention, an antistatic layer is formed with an ammonium-based antistatic coating solution, such that the antistatic coating layer is disposed on the opposite side (represented by reference numeral "131" in FIG. 6) to the surface of the pouch in contact with the protected surface. As a result, it is possible to minimize surface defects or scratches caused by contaminants such as external dust or mote and may occur upon transfer, storage and processing of display panels including polarizing plates, and to satisfy slipness, while preventing temporal variation in physical properties such as slipness.

Meanwhile, in the case where the protective film-integrated pouch of the present invention comprises additives such as an antioxidant, an antiblocking agent, a slip agent and antistatic agent on the surface of the inner surface layer 130 which contacts the protected surface, the additives gradually take up the outermost side of surface layers, thus causing the phenomenon, pol-dirty, on the protected surface. Accordingly, to prevent the pol-dirty, the surface layer contacting the protected surface is composed of only a polyethylene resin, without any additive.

The surface-protecting films may be applied to the surface of monitors and televisions in need of protection. Alternatively, a pouch shape of laminate film wherein a base film is further laminated on the surface-protecting film may be applied.

As described above, the results of vibration tests with a weight of 1.5 g for one hour, for the protective film-integrated pouch comprising the inner surface layer 130, from which an antistatic layer is excluded, which contacts the display panel demonstrated that the pouch can avoid the pol-dirty phenomenon.

Furthermore, the protective film-integrated pouch of the present invention exhibits water permeation of about 0.1 g/m² day, comparable to conventional aluminum-made pouches. This result indicates that the protective film-integrated pouch is resistant to water permeation.

In addition, the present inventors evaluated the high-temperature stability of the protective film-integrated pouch at a temperature of 50☐ and ambient humidity for 24 hours. As a result, neither transition from the inner surface layer of the pouch to the display panel nor absorption was observed.

In order to confirm the problems associated with the press of a liquid crystal display panel packaged with the protective film-integrated pouch during transfer or storage, bringing the inner surface layer of the pouch into contact with the display panel, the protective film-integrated pouch was overlapped with the liquid crystal display panel, such that the inner surface layer of the pouch came into contact with the panel, the pouch was rubbed with a block gauge of 475 g ten times or more and surface variation of the pouch was then observed. The temperature conditions were ambient temperature and high temperature (50☐). From test results, it can be seen that neither pouch nor display panel was varied. This behavior indicates that rubbing of the protective film-integrated pouch does not cause pol-dirty.

Figure 7A:
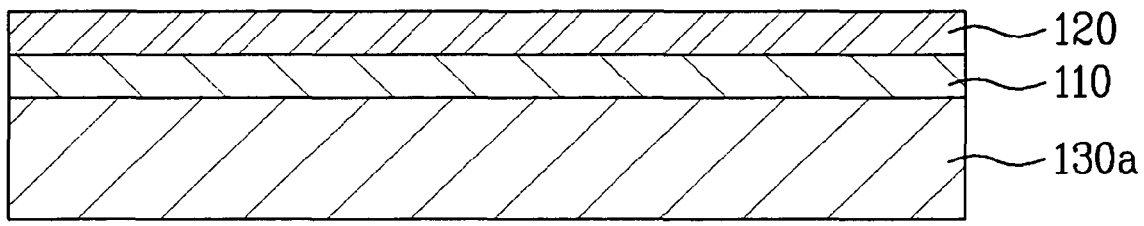
FIGS. 7A and 7B are sectional views illustrating a protective film-integrated pouch according to another embodiment.
Figure 7B:
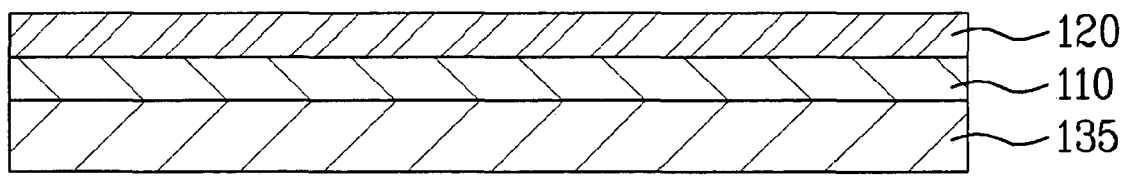

FIGS. 7A and 7B are sectional views illustrating a protective film-integrated pouch according to another embodiment.

The case wherein the protective film-integrated pouch has upper and lower film laminates having the same thickness was illustrated above. In some cases, the display panel 200 may comprise different thicknesses of an inner surface layer 130a and an inner surface layer 135 which contact an upper side (optical film-provided side such as polarizing plate) and a lower side (back light unit-containing liquid crystal module side), respectively.

FIG. 7A illustrates an upper film laminate wherein the first inner surface layer 130a has a thickness of 20 to 100 µm, as shown in FIG. 2. FIG. 7B illustrates a lower film laminate wherein the inner surface layer 135 has a smaller thickness of about 50±10 µm. The lower film laminate is a liquid crystal module having stiffness, which is thinner than the upper film laminate.

As apparent from the fore-going, the protective film-integrated pouch has advantages as follows:

The protective film and the pouch are integrally formed, thus eliminating the necessity of a process for attaching the protective film to a display panel and reducing an overall process time. In this case, for materials constituting components of the protective film-integrated pouch, the base layer is made of a metal to maintain stiffness, the outer surface layer is made of a nylon film to prevent the pouch from being snagged on the edges of display panels during transfer, the inner surface layer is made of a mixed polyethylene film softer than the material of the outer surface layer, to prevent damage of the pouch upon insertion and removal, while avoiding damage or contamination of display panels.

Furthermore, the protective film is unnecessary for the process, thus reducing material costs.

In addition, reoperation due to inattention by an operator or the necessity of additional protective films due to the damaged protective film can be absolutely avoided.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A protective film-integrated pouch for protection and insertion of a display panel therein, the pouch comprising a rectangular body, including an upper layer and a lower layer, the body having three sealed edges and one opened edge to define an opening allowing insertion of the display panel into the pouch, wherein each of the upper layer and the lower layer comprises:

a base layer made of a metallic material;

an outer surface layer disposed on the base layer; and an inner surface layer disposed under the base layer, wherein the inner surface layer is made of a mixed polyethylene resin and is configured to-be-contacted with the display panel inserted into the pouch, wherein the inner surface layer comprises:

an intermediate layer;

a first surface layer disposed on one side of the intermediate layer and a second surface layer disposed on another side of the intermediate layer, wherein at least one of the first surface layer and the second surface layer is made of a resin having a hardness lower than a hardness of the surface of the display panel inserted into the pouch, and the intermediate layer is made of a high-density polyethylene-containing resin; and an antistatic layer coated on the surface of the first or second surface layer not directly contacting the display panel inserted into the pouch.

2. The protective film-integrated pouch according to claim 1, wherein the base layer is made of an aluminium foil.

3. The protective film-integrated pouch according to claim 1, wherein the outer surface layer is made of a nylon film.

4. The protective film-integrated pouch according to claim 1, wherein the base layer has a thickness of 5 to 10µM, the outer surface layer has a thickness of 8 to 20µm, and the inner surface layer has a thickness of 20 to 100µm.

5. The protective film-integrated pouch according to claim 1, wherein the resin constituting the first and second surface layers has a pencil hardness lower than 2.5H.

6. The protective film-integrated pouch according to claim 1, wherein the intermediate layer is made of a mixed resin of high-density polyethylene, and linear low-density polyethylene or medium-density polyethylene.

7. The protective film-integrated pouch according to claim 6, wherein the intermediate layer consists of 20 to 80% by weight of the linear low-density polyethylene or medium-density polyethylene and 20 to 80% by weight of the high-density polyethylene.

8. The protective film-integrated pouch according to claim 1, wherein the inner surface layer of the upper layer is thicker than the inner surface layer of the lower layer.

* * * * *